Feb. 1, 1944.   S. MIKAMI   2,340,547
SAFETY DEVICE FOR MACHINE TOOLS
Filed Aug. 9, 1940

Inventor
Shinkuro Mikami

Patented Feb. 1, 1944

2,340,547

UNITED STATES PATENT OFFICE 2,340,547

SAFETY DEVICE FOR MACHINE TOOLS

Shinkuro Mikami, Tokyo, Japan; vested in the Alien Property Custodian

Application August 9, 1940, Serial No. 352,035

2 Claims. (Cl. 90—21)

My invention relates to improvements in a safety device for machine tools and more particularly to the use of a photo-electric tube put under the control of the cutting tool for controlling the operating motor, and has for its object to provide a photoelectrically controlled safety device for machine tools which is simple in construction and positive in operation for stopping the feed of a work at once when there occurs an accident to cause objections to the operation of the machine tool owing to some failure such as slowing down of the cutting tool and the like causes.

In machine tools such as milling machines an article to be machined, that is, work, is fed to the cutting tool while the latter is rotating and if some teeth of the cutting tool are broken the revolving tool should be stopped at once. Heretofore for this purpose a friction clutch or slipping belt has been used in some driving part of the machine tool in order to protect the cutting tool by allowing the driving mechanism to slip. But if in such a case the work is fed to the cutting tool either the work or the cutting tool might be damaged. In order to avoid such danger the work should be stopped as soon as the cutting tool is stopped.

This invention is to satisfy the above requirements by means of photo-electric current using alternating current amplifiers, filters, rectifiers and relays to control the work feeding motor.

Figure 1:
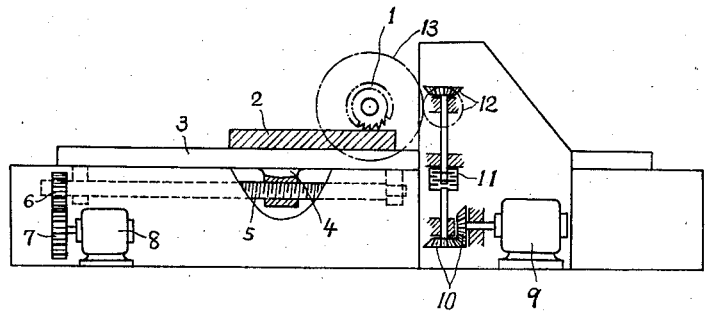
Figure 2:
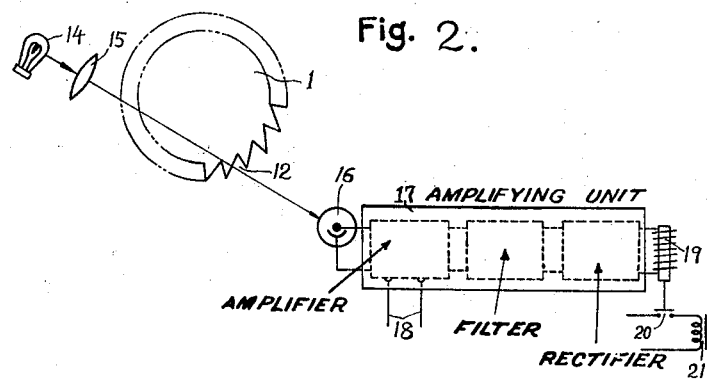

In the drawing, Fig. 1 is a diagrammatic elevation of a plano-miller to which is applied my invention; Fig. 2 is a diagrammatic view showing an arrangement of my invention and Figs. 3 and 4 are characteristic curves of the current taken for the explanation of operation of my invention.

Referring to the accompanying drawing, I represents a cutting tool such as a milling cutter and 2 is an article to be worked or machined. 3 is a working table which is moved to-and-fro by means of a half nut 4 secured thereto and a screw shaft 5 which latter is driven by a work feeding motor 8 through gear wheels 7 and 6. 9 represents an electric motor for driving the cutting tool 1 through the gear wheels 10, friction clutch 11 and a train of gear wheels 12 and 13. The friction clutch 11 is designed to slip automatically when the resistance of the cutting tool 1 increases beyond a predetermined value so that the tool may be safely protected, but it is very dangerous if the work 2 is not stopped immediately in such a case.

In accordance with this invention, a light source 14 is arranged in a certain relative position to the cutting tool 1 itself to project the light beam through a lens 15 and the clearance space between teeth of the cutter 1 upon a photo-electric tube 16 as shown in Fig. 2. The photo-electric tube is connected to the amplifying unit 17 consisting of an alternating current amplifier filter and rectifier which is excited from an exciting source through the lines 18, a filter and a rectifier. The output terminals of the amplifying unit 17 are connected to a relay 19, the contact 20 of which controls the circuit of an electromagnetic device 21 operating the main switch of the work feeding motor 8. In this case the teeth of the cutting tool themselves are taken advantage of as a light interrupter for passing or interrupting the light beam projected from the light source. As a modified embodiment of my invention, instead of using the cutting tool itself as a light interrupter a slotted disc may be arranged to rotate at a speed proportional to that of the cutting tool and to pass and interrupt the light beam projected to the photo-electric tube continuously.

Figure 3:
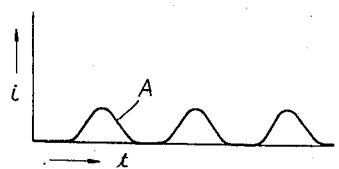
Figure 4:
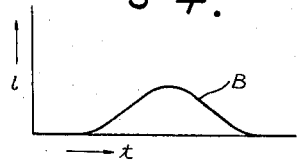

In the above described device of this invention, the photo-electric tube 16 generates pulsating current as shown by the curve A of Fig. 3 during the normal revolution of the cutting tool, so that the substantial amount of alternating current is amplified, filtered, and rectified in the amplifying unit 17 and the rectified current is supplied to the relay to hold the power switch of the motor 8 to the closed condition. If some teeth of the cutting tool 1 are caught causing a greater resistance to allow the clutch 11 to slip the cutting tool 1 is slowed down or stopped. Then the voltage induced in the photo-electric tube 16 will become a pulsating voltage of very low frequencies as shown by the wave form of the curve B of Fig. 4 so that the current may be impeded by means of a high path filter in the amplifying unit 17. Accordingly the relay 19 is practically deenergized and interrupts the current supplied to the motor 8 and the sliding table carrying the work is stopped.

Thus the present invention has characteristics of safely protecting the machine tool by positively stopping the feed of work to the cutting tool when the latter is stopped or is under abnormal operative conditions.

I claim:

1. A safety device for machine tools comprising a light source arranged in a suitable relation to the revolving cutting tool fitted to the machine tool, a photo-electric tube, a light projecting means to project the light through the spaces between teeth of the cutting tool on said photo-electric tube to generate pulsating current in the output circuit of said tube and a rectifying unit connected with said photo-electric tube to transmit the pulsating current to the circuit controlling device of an electric motor which feeds the work to said cutting tool.

2. A safety device for machine tools comprising a light source arranged in a suitable relation to the cutting tool secured to the machine tool to rotate, a photo-electric tube, an optical means to project the light through the spaces between teeth of the cutting tool on said photo-electric tube, a rectifying unit consisting of an alternating current amplifier connected to the output circuit of said photo-electric tube, a filter and a rectifier, and an electro-magnetic device connected to the output circuit of said rectifying unit and arranged to control the power supply to the work feeding motor.

SHINKURO MIKAMI.